United States Patent [19]

Schilling

[11] Patent Number: 4,990,590

[45] Date of Patent: Feb. 5, 1991

[54] ANIONIC SLURRY SEAL EMULSIFIERS

[75] Inventor: Peter Schilling, Charleston, S.C.

[73] Assignee: Westvaco Corporation, New York, N.Y.

[21] Appl. No.: 441,602

[22] Filed: Nov. 27, 1989

Related U.S. Application Data

[62] Division of Ser. No. 334,480, Apr. 7, 1989.

[51] Int. Cl.$^5$ .................... C08G 8/04; C08J 95/00; C07D 241/02
[52] U.S. Cl. .................... 528/129; 528/157; 528/159; 524/61; 523/333; 523/334; 544/357; 544/370; 544/359; 252/311.5; 252/368; 252/387; 106/277; 106/284.01; 106/284.4
[58] Field of Search .................... 528/157, 159, 129; 252/311.5, 387, 368; 106/277, 284.01, 284.4; 524/61; 523/333, 334; 544/357, 399, 370

[56] References Cited

U.S. PATENT DOCUMENTS 3,808,020  4/1974  Pitchford .................... 106/277
4,561,901 12/1985  Schilling .................... 106/277

Primary Examiner—John Kight, III
Assistant Examiner—P. Hampton-Hightower
Attorney, Agent, or Firm—Terry B. McDaniel; Richard L. Schmalz

[57] ABSTRACT

An anionic emulsifier obtained from the reaction products of an alkyl phenol, polyamine, and formaldehyde or of an alkyl phenol, fatty acid/polyamine condensate, and formaldehyde followed by the reaction of such products with acrylic acid, and the uses of the emulsifier in anionic bituminous emulsions and paving slurry seal mixtures are disclosed.

18 Claims, No Drawings

ANIONIC SLURRY SEAL EMULSIFIERS

This is a division of application Ser. No. 07/334,480, filed Apr. 7, 1989, now abandoned.

BACKGROUND OF THE INVENTION

(1) Field of the Invention

This invention relates to slurry seal emulsions. More particularly, it relates to novel emulsifiers for solventless and solvent containing, mixing grade, oil-in-water anionic bituminous emulsions, which emulsifiers are derived from the reaction products of alkyl phenols, aldehydes and polyamines, post-reacted with acrylic acid.

(2) Description of related art

In paving operations, three main practices are employed to achieve thorough mixing of bitumen and aggregate:
  (1) mixing of free flowing heated asphalt (asphalt cement) with pre-dried aggregate;
  (2) mixing pre-dried aggregate with asphalt diluted with a hydrocarbon solvent (cutback asphalt, cutter stock) at ambient temperatures; and
  (3) mixing aggregate with asphalt emulsions, e.g., oil-in-water emulsions, obtained by vigorous agitation of asphalt and water in the presence of an emulsifying agent.

Because of increasing cost in energy and hydrocarbon solvent and because of environmental concerns, the use of emulsified asphalt is increasing.

Conventionally, emulsion slurry seals are formulated from mineral aggregate which is a fine stone aggregate and/or mineral filler and a mixing-grade, quick-setting or slow-setting emulsion containing bituminous residue (usually asphalt), and water to attain slurry consistency. Usually, densely-graded aggregates, such as granite screening, limestone screening, dolomite screening and blast furnace slag, are combined with bituminous emulsions to produce slurry seal compositions.

When a slurry seal is used in paving and road maintenance, the mixture of emulsified bituminous material and fine-grained aggregate is held in suitable suspension until applied to the road surface. The slurry seal emulsion is of an oil-in-water type.

Depending on the emulsifier used to achieve an emulsion, anionic or cationic emulsions are obtained. In anionic emulsions, asphalt droplets are negatively charged; in cationic emulsions, the asphalt droplets bear positive charges.

In a bituminous emulsion formulated using anionic emulsifiers the bituminous material is deposited from the emulsion on calcareous aggregate due to the attraction of polar charges between the negatively charged bituminous droplets and positively charged aggregate surfaces.

Anionic bituminous emulsions are taught by Wright and Mertens in U.S. Pat. No. 3,062,829 to be prepared by employing alkali emulsifier and polyamide additives which are the condensation products of dilinoleic acid and polyalkylene polyamines. Lignin amines are taught as anionic emulsifiers in U.S. Pat. No. 3,123,569 to Borgfeldt. Also, Moorer, in U.S. Pat. No. 3,956,002, teaches an anionic emulsifier consisting of an oxygenated alkali lignin, an ethylene oxide adduct of alkylphenol, and up to 10% by weight of sodium borate; and, in U.S. Pat. No. 4,088,505, he teaches an anionic emulsifier consisting of an alkali metal salt of an alkali lignin, an ethylene oxide adduct of alkylphenol and water. In addition, Montgomery and Pitchford teach the alkali metal salts of complex polynuclear aromatic polycarboxylic acids as anionic asphalt emulsifiers in U.S. Pat. No. 3,344,082. Heinz, in U.S. Pat. No. 3,006,860, similarly employs alkali metal soaps of higher fatty acids as those found in tall oil.

Ferm, in U.S. Pat. No. 3,740,344, teaches the preparation of quick-setting anionic slurry seal compositions by applying a combination of anionic emulsifiers such as aryl alkyl sulfonates and condensation products of ethylene oxide with alkylated phenols, with fatty alcohols, with mono-esters of fatty acids with glycerol or sorbitol or long chain fatty acids. H. G. Schreuders, in U.S. Pat. No. 3,615,796, teaches the use of petroleum sulfonates as quick-setting anionic slurry seal emulsifiers. A combination of sodium lignate or lignosulfonate and saponified rosin or tall oil is described in U.S. Pat. No. 3,594,201 by Sommer and Evans. Also, Conn, in U.S. Pat. No. 3,350,321, describes the use or alkyl or alkoxyalkyl phosphoric acids as emulsifiers for asphalts The use of tallow quaternary ammonium salts and tallow diquaternary diammonium salts for making emulsions suitable for slurry seal in solventless applications is described in U.S. Pat. No. 3,764,359 to Dybalski.

The uses of acidified reaction products of certain polycarboxylic acids, anhydrides, sulfonated fatty acids and epoxidized glycerides with certain polyamines as emulsifiers yielding asphalt emulsions which can mixed with fine grained aggregate to give workable aggregate/emulsion mixes are disclosed in U.S. Pat. No. 4,447,269 to Schreuders et al., U.S. Pat. No. 4,450,011 to Schilling et al., U.S. Pat. 4,547,224 to Schilling et al., U.S. Pat. No. 4,462,890 to Schilling et al. U.S. Pat. No. 4,464,286 to Schilling, U.S. Pat. No. 4,561,901 to Schilling, U.S. Pat. No. 4,597,799 to Schilling, and U.S. Pat. No. 4,676,927 to Schilling et al. The use of a quaternary amine obtained by reacting epichlorohydrin, trimethylamine and nonylphenol for solventless mixes is disclosed in U.S. Pat. No. 3,957,524 to Doughty.

Quick-setting bituminous emulsion compositions wherein amine and alkanolamine salts of alkylbenzenesulfonic acid are used as emulsifiers are disclosed in the U.S. Pat. No. 4,657,595 to Russell.

The general object of this invention is to provide novel versatile anionic emulsifiers for solventless and solvent containing, rapid setting, mixing grade, oil-in-water bituminous emulsions.

Another object is to provide an anionic bituminous emulsion for mixing with aggregates whose coating characteristics and set time can be varied.

SUMMARY OF THE INVENTION

It has been found that emulsifiers capable of producing anionic slurries may be obtained by the reaction products of an alkylphenol such as octylphenol, nonylphenol or dodecylphenol with a polyamine such as aminoethylpiperazine and with an aldehyde such as formaldehyde, followed by a reaction of this product with acrylic acid.

Anionic emulsifiers may also be obtained by using a fatty amidoamine or imidazoline in place of the polyamine. By varying the ratios of reactants, a series of products with various molecular weights and various ratios of hydrophobe/hydrophile can be obtained.

DETAILED DESCRIPTION OF THE PREFERRED EMBODIMENT

The anionic slurry seal emulsifier of this invention comprises the reaction product of an alkyl phenol, a polyamine and an aldehyde by the Mannich reaction, whereby nitrogen functionality is introduced onto the phenyl ring at the unsubstituted position ortho or para to the phenolic hydroxyl group:

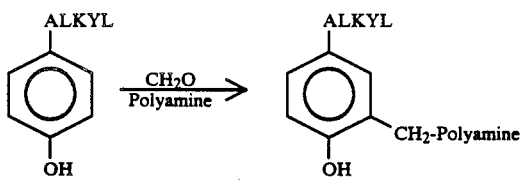

followed by the reaction of the above product with acrylic acid through the Michael addition, which gives a carboxyethylated product:

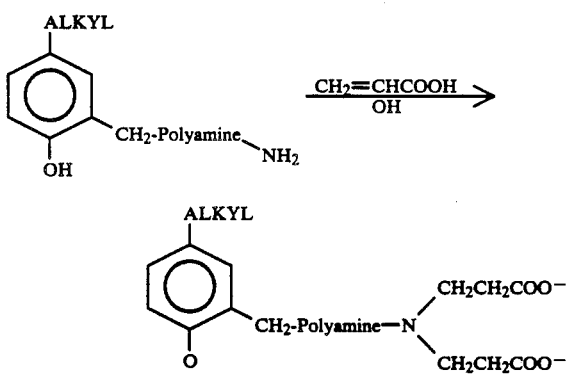

Any alkyl phenol may be used in the practice of this invention, so long as it has at least one unsubstituted position ortho or para to the phenolic hydroxyl group. Preferably the alkyl group has 8-20 carbons, most preferably 8-2 carbons. Examples of suitable alkyl phenols include octylphenol, nonylphenol, and dodecylphenol.

Polyamines suitable to undergo the Mannich reaction with formaldehyde or other aldehydes as well as polyaldehydes are imidazoline forming polyethylene amines and polyamines characterized by at least one ethylene diamine functional group with at least three hydrogens attached to the two nitrogens. Compounds of this group which are able to give both amidoamines and imidazolines are: Ethylene diamine, diethylene triamine, triethylene tetramine, tetraethylene pentamine, pentaethylene hexamine, and higher homologues; N-aminoethylpropane diamine, N,N-diaminoethyl substituted butane diamine, pentane diamines and hexane diamines, as well as N-hydroxy ethyl ethylene diamine. These compounds have the general formulae:

$$H_2NCH_2CH_2NHR$$

R=H—, CH$_3$—, C$_2$H$_5$—, C$_3$H$_7$—, —CH$_2$CH$_2$OH,
—(CH$_2$CH$_2$NH)$_x$H
x=1, 2, 3, 4, ... 10
or $$R'R''N(CH_2)_yNHR'''$$

R'=H—, CH$_3$—, C$_2$H$_5$—, C$_3$H$_7$—, NH$_2$CH$_2$CH$_2$—,
R''=H—, CH$_3$—, C$_2$H$_5$—,
R'''=H—, CH$_3$—, C$_2$H$_5$—, C$_3$H$_7$—, NH$_2$CH$_2$CH$_2$—,
y=2, 3, 4, 5, 6.

Amines capable of forming amidoamines but not imidazolines are: 1,3-diaminopropane; 1,4-diaminobutane; 1,5-diaminopentane; 1,6-diaminohexane; piperazine (I,4-diazocyclohexane); N-aminoethyl piperazine; N-hydroxyethyl piperazine; N-aminopropylpropane diamine; 1,3-N-methyl N-aminopropylpropane diamine; 1,3-N,N-dimethylpropane diamine; 1,3-N,N-diethylpropane diamine; 1,3-N,N-dimethylethylene diamine; N-aminohexyl hexane diamine-1,6. Diamines whereby the amino groups are separated by polyethylene oxide chains or polypropylene oxide chains are also very suited for the Mannich reaction.

These compounds have the general formulae:

$$H_2NCH_2CH_2O(CH_2CH_2O)_xCH_2CH_2NH_2$$

x=0-100

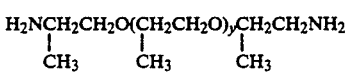

y = 0-100

The above described amines can be further modified by reaction with alkylating agents or cross-linking agents such as are described in U.S. Pat. No. 4,775,744 by P. Schilling et al. in connection with lignin modification. Modified amines or amine mixtures with increased molecular weight or amines which have additional reactive functionalities such as sulfonic acid, carboxyl, hydroxyl, nitrile, and quaternary-ammonium groups will be obtained. For the aminomethylation, however, it is necessary that at least one hydrogen on any of the nitrogens of the parent polyamine be available for the condensation with formaldehyde.

The polyamine as used in the practice of this invention may be a mixture of two or more of the compounds described above. An example of a commercially available polyamine is the polyamine sold by Union Carbide under the designation of Amine HH. Amine HH is a blend of polyamines consisting mainly of aminoethylpiperazine and triethylene tetramine.

Suitable reactants for the Mannich reaction include the following: aldehydes such as formaldehyde (the preferred reagent), benzaldehyde, or other tertiary aldehydes; dialdehydes such as glutaraldehyde and glyoxal; or unsaturated aldehydes such as acrolein or croton aldehyde.

The emulsifier of the present invention may be prepared by dissolving the desired amount of alkylphenol and polyamine in water/isopropanol to yield a 70% solution, adding the required amount of a 37% formaldehyde solution slowly with stirring (the reaction is exothermic) and heating the mixture three hours at 90° C. The relative amount of alkylphenol and polyamine added depends on the hydrophobe/hydrophile ratio desired in the final product.

The reaction product from the alkyl phenol-polyamine-formaldehyde condensation is blended with acrylic acid and heated to 70° C. for 2-3 hours to make the anionic emulsifier.

The use of a polyamine in the Mannich reaction allows for crosslinking the polyamine with the aldehyde and results in a series of products with various molecular weights and various ratios of hydrophobe/hydrophile. Examples for this type of reaction are the products obtained from p-dodecylphenol, formaldehyde, and aminoethylpiperazine:

Low molecular weight products:

(a) Mono-substitution on phenol.
Phenol/Amine (1:1)

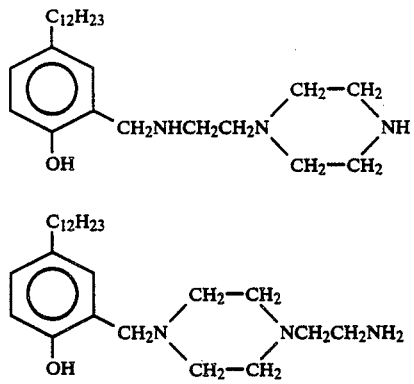

(b) Mono-substitution on phenol.
Phenol/Amine (2:1)

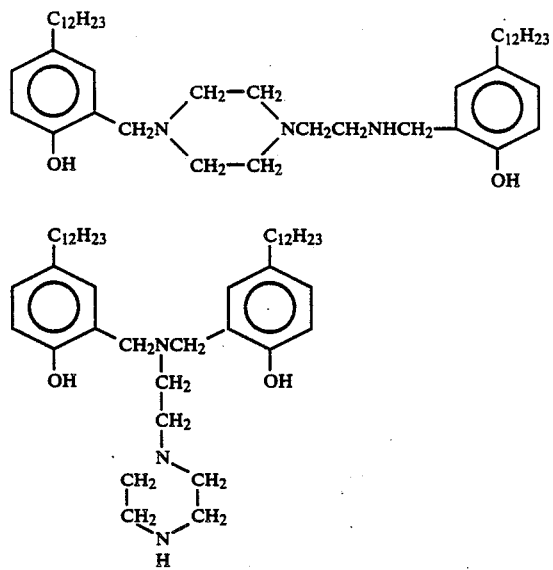

(c) Distribution on phenol.
Phenol/Amine (1:2)

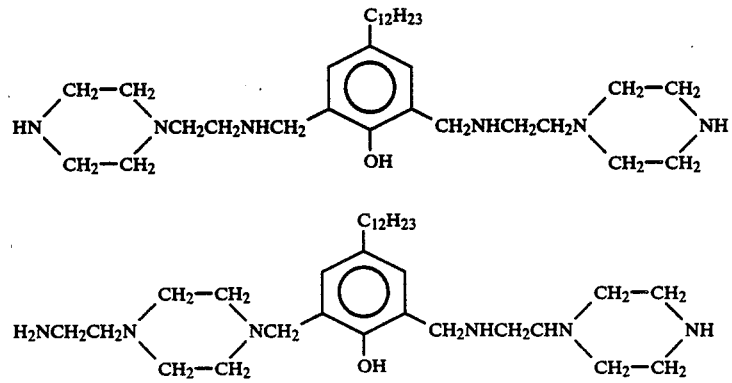

-continued

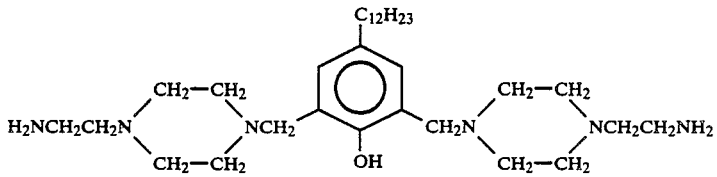

(d) Cross-linking of polyamine with formaldehyde and di-substitution of phenol.

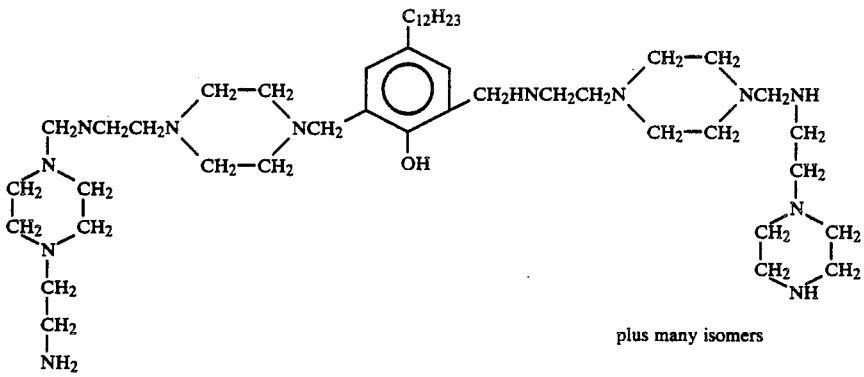

plus many isomers

These formulae represent ideal cases, in reality, the reaction product will represent mixtures of the products shown above as well as other isomers.

The above products will be carboxyethylated by the addition of acrylic acid to any primary or secondary nitrogen of the above compounds.

Further products may be obtained by using fatty amidoamines or imidazolines in combination with or in place of the polyamine in the condensation reaction with an alkyl phenol. Suitable fatty amidoamines or imidzaolines include the condensation products of polyamines with tall oil fatty acid, or with tall oil fatty acid modified by the addition of acrylic acid, methacrylic acid, fumaric acid or maleic anhydride. Examples of suitable fatty acid/polyamine condensates are found in U.S. Pat. No. 4,447,269 issued to Schreuders, et al., and U.S. Pat. No. 4,561,901 issued to Schilling, the disclosures of which are incorporated herein by reference.

Fatty acid/polyamine condensates are available commercially from Westvaco Corporation and are sold under the trademarks Indulin$^R$ RK-1, Indulin$^R$ MQK, and Indulin$^R$ MQK-1M. In the preparation of an emulsifier with a fatty acid/polyamine condensate, the fatty acid/polyamine condensate is blended with alkylphenol and the mixture is diluted with isopropanol. A 37% solution of formaldehyde is added slowly with stirring (the reaction is exothermic) and the mixture is heated at 90° C. for 3 hours.

The reaction product is then blended with acrylic acid and the mixture is heated to 70° C. for 2-3 hours to obtain the carboxyethylated product.

Condensation products of p-dodecylphenol with formaldehyde and fatty acid/aminoethylpiperazine condensates can be visualized as follows:

(TOFA - Amidoamine):

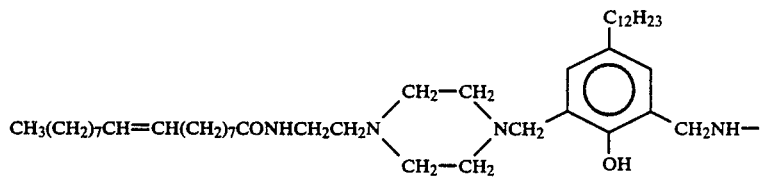

$C_{21}$ - dicarboxylic acid diamidoamine:

-continued

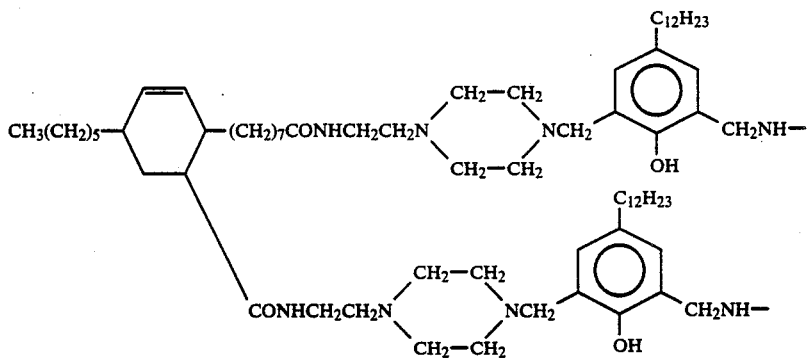

C₂₂ - tricarboxylic acid triamidoamine

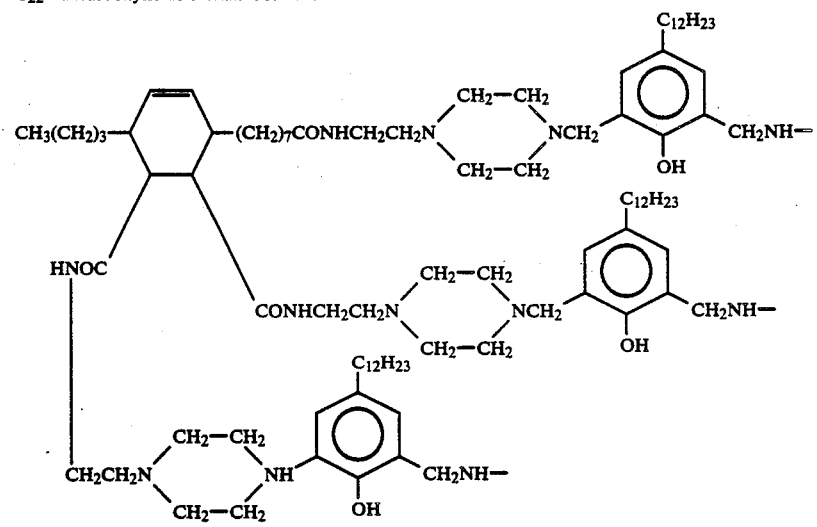

Acrylic acid adds to primary and secondary nitrogens of the above compounds to make the anionic product.

In preparing the anionic bituminous emulsions of this invention, an aqueous basic solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.5–2% by weight of the emulsion. Dependent on the emulsifier, a slurry grade anionic emulsion is obtained in a pH range of from greater than 7 to 12, with the optimum performance at a pH of about 10 to 11.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use on pavement contruction as described in ASTM designation D-3381 and D-946 may be emulsified with the aid of the emulsifiers of this invention.

The alkaline soap solutions are normally obtained by suspending the reaction product of alkyl phenol-polyamine-aldehydeacrylic acid or alkyl phenol-fatty amidoamine/imidazoline-aldehydeacrylic acid in water to which a suitable amount of sodium hydroxide or any other suitable base is added as necessary to obtain the desired pH value of from greater than 7 to 12 and a clear emulsifier solution.

Thereafter, the soap solution which is preheated to 55° C. and the fluid asphalt which is preheated to 120°–125° C. are mixed under high shear in a colloid mill to give asphalt emulsions of brown color and creamy texture. Prior to testing according to ASTM D-2444, the emulsions are stored at 70° C. for 16 hours.

The paving slurry seal mixture is prepared by mixing a mineral aggregate, from about 8% to about 20% (based on weight of the aggregate) of the anionic bituminous emulsion, from about 4% to about 16% water and up to 3% of an inorganic additive such as Portland cement, hydrated lime, limestone dust or fly ash, or an organic additive such as polymer latex. Such additives should comply with the requirements of ASTM D-242.

The aggregates of the invention paving slurry seal mixtures are densely graded aggregates which range in size from anything passing through a No. 4 sieve to at least 80% retained on 200 mesh.

The emulsion should be stable during mixing and should set within the desired time period following application. The setting times can be controlled with the concentration of emulsifier, the addition of lime, cement or other inorganic additives or an organic additive, which would alter the break characteristics of the slurry system. An organic additive-polymer latex may also be employed to strengthen the matrix. The organic additive is preferably added to the emulsion-aggregate slurry.

In instances where it is desired to alter the performance of the emulsion to obtain improved viscosity at a given asphalt content or improved stability to dust and fines, blends of the invention anionic emulsifiers with emulsifiers commonly used for anionic bituminous emulsions can be employed. Examples of such emulsifiers are fatty acids, especially tall oil, rosin acids, lignin isolated from sulfite or kraft pulping lignins, and sulfonic acid-containing surfactants such as alkylsulfonates, long chain alkylsulfonates and petroleum sulfonates.

$C_{19}$-dicarboxylic acid, $C_{21}$-dicarboxylic acid, $C_{22}$-tricarboxylic acid or sulfonated fatty acids may also be blended with the invention emulsifiers prior to the addition of alkali.

Depending on the type of aggregate and its cleanliness, mixing is improved when aggregate is prewetted with 1–5% water by weight of the aggregate. The performance of the asphalt emulsions in regard to mixing characteristics and setting (higher percentage of one-hour washoff coat) can, if necessary, also be improved when, based on the weight of asphalt, 1–15% of a solvent such a diesel oil is added to the asphalt prior to emulsification. The emulsions prepared with the emulsifiers disclosed in this invention are stable and can be stored for a long period of time until required for use.

Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

As a paving technique at the roadsite, a mobile self-propelled unit capable of uniformly metering the aggregate, water, inorganic and organic additives emulsion components, may be used. A typical unit is equipped with separate tanks for aggregate, water, emulsion and additives which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the bituminous aggregate slurries of this invention.

The practice of this invention may be seen in the following examples wherein the preparation of various types of slurries of the invention is described.

EXAMPLE 1

The following variety of alkylphenol/polyamine/aldehyde carboxyethylated emulsifiers were prepared for emulsion-aggregate slurry testing.

Emulsifier A

An emulsifier with a weight ratio of 100:47.5:11.4 of nonylphenol, Amine HH and formaldehyde, respectively, was prepared as follows:

100 g of nonylphenol was blended with 47.5 g Amine HH and the mixture was diluted with isopropanol to make a 70% solution. 30.8 grams of a 37% solution of formaldehyde was added slowly with stirring and the mixture was heated to 90° C. for 3 hours.

This product was converted to an anionic emulsifier with a weight ratio of 1:0.33 of the reaction product to acrylic acid as follows:

30 g of the product of the above reaction was blended with 10 g acrylic acid and heated to 70° C. for 2–3 hours.

Emulsifier B

An emulsifier with a weight ratio of 100:94.7:22.8 of nonylphenol, Amine HH and formaldehyde, respectively, was prepared as described above and was converted to an anionic emulsifier by the addition of acrylic acid in a weight ratio of 1:0.33 of reaction product to acrylic acid, respectively, prepared as described above.

Emulsifier C

100:148:34.2 weight ratio of nonylphenol, Amine HH and formaldehyde, respectively, prepared as above.

1:0.33 weight ratio of reaction product to acrylic acid, respectively, prepared as above.

Emulsifier D

100:71:17.3 weight ratio of dodecylphenol, Amine HH, formaldehyde, respectively, prepared as above.

1:0.33 weight ratio of reaction product to acrylic acid, respectively, prepared as above.

Emulsifier E

100:94.7:22.8 weight ratio of dodecylphenol, Amine HH, formaldehyde, respectively, prepared as above.

1:0.33 weight ratio of reaction product to acrylic acid, respectively, prepared as above.

Emulsifier F

100:148:39.2 weight ratio of dodecylphenol, Amine HH, formaldehyde, respectively, prepared as above.

1:0.33 weight ratio of reaction product to acrylic acid, respectively, prepared as above.

Emulsifier G

Weight ratio of 100:165.7:40 dodecylphenol, Amine HH, formaldehyde, respectively, prepared as above.

1:0.33 weight ratio of reaction product to acrylic acid, respectively, prepared as above.

EXAMPLE 2

Anionic emulsions were prepared with 64% Exxon$^R$ 125/150 penetration asphalt, 1.5% emulsifier at pH 11.5 (adjusted with sodium hydroxide) and water to make up 100% (percentages based on weight of asphalt) Emulsions were prepared for each of the emulsifiers described in Example 1.

Next slurries were prepared by mixing 100 grams of Camak (Georgia) granite screenings aggregate, with an anionic aqueous bituminous emulsion, and water in the amounts set out in Table I below. Additional samples were prepared with cement or NaOH added to the mix. The materials were mixed in a mixing bowl until a homogeneous slurry mixture was obtained. This mix design is necessary to simulate field conditions. The inability to form a stable slurry within 2 to 3 minutes of mixing time when proper proportions of each ingredient are used would indicate a mixture in which the materials are not compatible. After the slurry was mixed, it was spread in a mold placed on an asphalt felt. The set/break time was measured by blotting the exposed slurry surface with a paper towel. The slurry is considered to be "set" when no stain is transferred to the towel. The cure time could also be measured with a cohesion testing device.

The percent of retained asphalt coating on the aggregate was determined visually after curing of the mixes at room temperature overnight and boiling in water for 10 minutes.

Many other tests such as described in ASTM D-3910 are used to measure strength and other physical properties of slurry. The Performance Guide for Slurry Seal published by the Asphalt Emulsion Manufacturers Association can be used to measure the performance of the slurry seal.

The flow behavior, set/break time and percent of retained asphalt coating on the aggregate were determined for slurries using emulsifiers A, B, C, D, and E with and without Portland cement or NaOH added to the mix. Test results are set out in Table I below:

TABLE I
Anionic Slurry Seal Emulsions Prepared with Carboxyethylated Alkylphenol - Mannich Bases

| Emulsifier | pH | Mixing Conditions[a] (%) | Flow Behavior | Set Time (min) | % Coating[b] |
|---|---|---|---|---|---|
| A | 11.5 | 10 W 16 E | Broke in 05 secs | — | — |
|  |  | 2 C 10 W 16 E | Broke in 05 secs | — | — |
|  |  | 1 NaOH 10 W 16 E | Excellent | 60+ | — |
| B | 11.5 | 10 W 16 E | Broke in 55 secs | — | — |
|  |  | 2 C 10 W 16 E | Broke in 05 secs | — | — |
|  |  | 0.5 NaOH 10 W 16 E | Broke in 05 secs | — | — |
|  |  | 1.0 NaOH 10 W 16 E | Broke in 20 secs | — | — |
|  |  | 1.5 NaOH 10 W 16 E | Poor | 60+ | 85 |
|  |  | 2.0 NaOH 10 W 16 E | Poor | 60+ | 90 |
| C | 11.5 | 10 W 16 E | Excellent | 60+ | 90 |
|  |  | 2 C 10 W 16 E | Excellent | 15 | 90 |
| D | 11.5 | 10 W 16 E | Broke in 25 secs | — | — |
|  |  | 2 C 10 W 16 E | Broke in 05 secs | — | — |
|  |  | 0.5 NaOH 10 W 16 E | Excellent | 60+ | 90 |
| E | 11.5 | 10 W 16 E | Broke in 45 secs | — | — |
|  |  | 2 C 10 W 16 E | Broke in 05 secs | — | — |
|  |  | 0.5 NaOH 10 W 16 E | Excellent | 60+ | 100 |
| F | 11.5 | 10 W 16 E | Excellent | 60+ | 85 |
|  |  | 2 C 10 W 16 E | Broke in 05 secs | — | — |
|  |  | 0.5 NaOH 10 W 16 E | Excellent | 60+ | 80 |
| G | 11.5 | 10 W 16 E | Excellent | 60+ | 80 |
|  |  | 2 C 10 W 16 E | Broke in 05 secs | — | — |
|  |  | 0.1 NaOH 10 W 16 E | Excellent | 60+ | 90 |

[a]W: water, E: emulsion, C: cement, NaOH: 1% solution in water; percent based on the weight of the aggregate;
[b]after boiling water for 10 minutes.

As Table I shows, the ratio of nonyl or dodecyl phenol to Amine HH had to be less than 1.0 and the ratio of phenol to formaldehyde had to be less than 3 to produce emulsions which could be mixed with aggregate for 60 seconds without the addition of a mixing aid. Addition of 0.5–1.5 parts 1% NaOH solution per 100 parts of aggregate resulted in fluid slurry seal mixes independent of the composition of emulsifier. In the presence of 2 parts cement the emulsions broke prematurely (except C). The retained coating of the aggregate after boiling in water for 10 minutes was good.

EXAMPLE 3

The following variety of carboxyethylated alkylphenol—fatty amine—aldehyde emulsifiers were prepared for emulsion—aggregate slurry testing:

Emulsifier H

An emulsifier with a weight ratio of 100:10:0.74 of Indulin MQK, nonylphenol and formaldehyde, respectively was prepared as follows:

100 g of Indulin MQK was blended with 10 g nonylphenol and the mixture was diluted with isopropanol, 2 g of a 37% formaldehyde solution was added with good stirring, and the mixture was heated to 90° C. for 3 hours.

This reaction product was converted to an anionic emulsifier with a weight ratio of 1:0.33 of the reaction product to acrylic acid as follows:

30 g of the reaction product was blended with 10 g acrylic acid and the mixture was heated to 70° C. for 2–3 hours.

Emulsifier I

An emulsifier with a weight ratio of 100:20:1.48 of Indulin MQK, nonylphenol and formaldehyde, respectively, was prepared as above and was converted to an anionic emulsifier by the addition of acrylic acid in a weight ratio of 1:0.33 of the reaction product to acrylic acid, respectively, prepared as described above.

Emulsifier J

Weight ratio of 100:30:2.22 of Indulin MQK, nonylphenol, and formaldehyde, respectively, prepared as above.

1:0.33 weight ratio of reaction product to acrylic acid, respectively, prepared as above.

Emulsifier K

Weight ratio of 100:25:1.85 of Indulin MQK-1M, nonylphenol and formaldehyde, respectively, prepared as above.

1:0.33 weight ratio of reaction product to acrylic acid, respectively, prepared as above.

Emulsifier L

Weight ratio of 100:50:3.7 of Indulin MQK-1M, nonylphenol and formaldehyde, respectively, prepared as above.

1:0.33 weight ratio of reaction product to acrylic acid, respectively, prepared as above.

EXAMPLE 4

Slurries were prepared and tested as described in Example 2, above. Results of testing are set out in Table II, below.

TABLE II

Anionic Slurry Seal Emulsions Prepared with Carboxyethylated Indulin MQK Nonylphenol-Formaldehyde and Indulin MQK-1M Nonylphenol-Formaldehyde Condensates

| Emulsifier | pH | Mixing Conditions[a] % | Flow Behavior | Set Time (min) | % Coating[b] |
|---|---|---|---|---|---|
| H | 11.5 | 10 W 16 E | Excellent | 60+ | 75 |
| | | 2 C 10 W 16 E | Excellent | 15 | 75 |
| I | 11.5 | 10 W 16 E | Excellent | 60+ | 95 |
| | | 2 C 10 W 16 E | Good | 10 | 80 |
| J | 11.5 | 10 W 16 E | Excellent | 60+ | 90 |
| | | 2 C 10 W 16 E | Good | 10 | 80 |
| K | 11.5 | 10 W 16 E | Excellent | 60+ | 75 |
| | | 2 C 10 W 16 E | Broke in 20 secs. | — | — |
| L | 11.5 | 10 W 16 E | Excellent | 60+ | 90 |
| | | 2 C 10 W 16 E | Broke in 10 secs. | — | — |

[a]W: water, E: emulsion, C: cement, percent based on the weight of the aggregate;
[b]after boiling water for 10 minutes.

As Table II shows, emulsions prepared with modified INDULIN MQK could be mixed with aggregate with an without 2% cement present in the mix. Emulsions prepared with modified INDULIN MQK-1M could be mixed for 60 seconds without the addition of cement, but broke prematurely when cement was present. The retained coating after subjecting the cured mix to the 10 minute boiling test was good.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. A paving slurry seal mixture of an aqueous bituminous emulsion and mineral aggregate capable of being worked comprising: a densely graded mineral aggregate passing through no. 4 and at least 80% retained on 200 mesh screen; from about 8% to about 20% of an oil in water type emulsion, based on the weight of the mineral aggregate, wherein the emulsion is comprised of from about 60% to about 70% bitumen, based on the weight of the emulsion, from about 0.5% to about 2% of an anionic emulsifier based on the weight of the emulsion, and water to make up 100% by weight of the emulsion; and from about 4% to about 16% water, based on the weight of the mineral aggregate, added to form a slurry of the aggregate and the emulsion; wherein the emulsifier is the reaction product of (1) acrylic acid reacted with (2) the reaction product of (a) an alkyl phenol of the general form

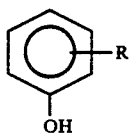

where R represents a linear or branched alkyl group, (b) an aldehyde, and (c) a polyamine wherein the ratio of alkyl phenol to formaldehyde is less than 3 and the ratio of alkyl phenol to polyamine is less than 1.

2. The paving slurry seal mixture of claim 1, wherein said alkyl group comprises from 8 to 20 carbons.

3. The paving slurry seal mixture of claim 1 wherein said alkyl phenol is selected from the group of octylphenol, nonylphenol and dodecylphenol.

4. The paving slurry seal mixture of claim 1 wherein said aldehyde is formaldehyde.

5. The paving slurry seal mixture of claim 1 wherein said polyamine is a blend of polyamines comprising aminoethylpiperazine and triethylene tetramine.

6. The paving slurry seal mixture of claim 1 wherein said alkyl phenol is selected from the group of octylphenol, nonylphenol and dodecylphenol, said aldehyde is formaldehyde, and said polyamine is a blend of polyamines comprising aminoethylpiperazine and triethylene tetramine.

7. The paving slurry seal mixture of claim 6 wherein the emulsion is a mixing grade composition.

8. The paving slurry seal mixture of claim 1 wherein said emulsion has a pH of from 10.0 to 11.5.

9. The paving slurry seal mixture of claim 8 wherein up to 90% of the total emulsifier is comprised of one or more auxiliary emulsifiers selected from the group consisting of fatty acids, resin acids, lignins isolated from sulfite or kraft pulping liquors, or alkylsulfonates, long chain alkylsulfonates and petroleum sulfonates.

10. A paving slurry seal mixture of an aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 60% to about 70% bitumen, based on the weight of the emulsion, from about 0.5% to about 2% of an anionic emulsifier based on the weight of the emulsion, and water to make up 100% by weight of the emulsion; and from about 4% to about 16% water, based on the weight of the mineral aggregate, added to form a slurry of the aggregate and the emulsion; wherein the emulsifier is the reaction product of (1) acrylic acid reacted with (2) the reaction product of (a) an alkyl phenol of the general form

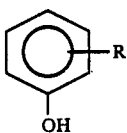

where R represents a linear or branhed alkyl group, (b) an aldehyde, and (c) the reaction product of a polyamine and a compound selected from the group of a tail oil fatty acid, a polycarboxylic acid corresponding to the formula

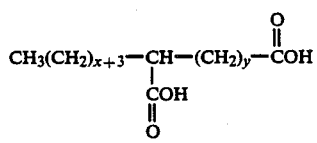

and a polycarboxylic acid corresponding to the formula

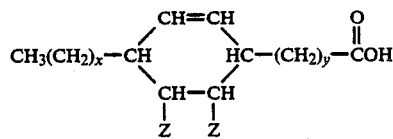

wherein x and y are integers from 3 to 9, x and y together equal 12, at least one Z is a carboxylic acid group and any remaining Z is hydrogen and wherein the ratio of alkyl phenol to formaldehyde is less than 3 and the ratio of alkyl phenol to the polyamine reaction product is less than 1.

11. The paving slurry seal mixture of claim 10 wherein said alkyl group comprises from 8 to 20 carbons.

12. The paving slurry seal mixture of claim 10 wherein said alkyl phenol is selected from the group of octylphenol, nonylphenol and dodecylphenol.

13. The paving slurry seal mixture of claim 10 wherein said aldehyde is formaldehyde.

14. The paving slurry seal mixture of claim 10 wherein said polyamine is a blend of polyamines comprising aminoethylpiperazine and triethylene tetramine.

15. A paving slurry seal mixture of claim 10 wherein said alkyl phenol is selected from the group of octylphenol, nonylphenol and dodecylphenol, said aldehyde is formaldehyde, and said polyamine is a blend of polyamines comprising aminoethylpiperazine and triethylene tetramine.

16. The paving slurry seal mixture of claim 15 wherein the emulsion is a mixing grade composition.

17. The paving slurry seal mixture of claim 15 wherein said emulsion has a pH of from 10.0 to 11.5.

18. The paving slurry seal mixture of claim 17 wherein up to 90% of the total emulsifier is comprised of one or more auxiliary emulsifiers selected from the group consisting of fatty acids, resin acids, lignins isolated from sulfite or kraft pulping liquors, or alkylsulfonates, long chain alkylsulfonates and petroleum sulfonates.

* * * * *

UNITED STATES PATENT AND TRADEMARK OFFICE
CERTIFICATE OF CORRECTION

PATENT NO. : 4,990,590                              Page 1 of 2
DATED : February 5, 1991
INVENTOR(S) : Peter Schilling It is certified that error appears in the above-indentified patent and that said Letters Patent is hereby corrected as shown below:

In column 2, line 21, delete the first occurrence of "or" and substitute therefor --of--.

In column 2, line 35, after et al., insert --,--.

In column 3, line 42, delete "8-2" and substitute therefor --8-12--.

In column 4, line 9, delete "I,4" and substitute therefor --1,4--.

In column 5, section c, delete "Distribution" and substitute therefor --Di-substitution--.

In column 9, second chemical structure, first line, delete "$CH_3(CH_2)_3$" and substitute therefor --$CH_3(CH_2)_5$--.

UNITED STATES PATENT AND TRADEMARK OFFICE
CERTIFICATE OF CORRECTION

PATENT NO. : 4,990,590

DATED : February 5, 1991

INVENTOR(S) : Peter Schilling

It is certified that error appears in the above-indentified patent and that said Letters Patent is hereby corrected as shown below:

In column 15, line 28, delete "an" and substitute therefor --and--.

In Claim 10, column 16, line 68, delete "general".

In Claim 10, column 17, line 8, delete "branhed" and substitute therefor --branched--.

In Claim 10, column 17, line 11, delete "tail" and substitute therefor --tall--.

Signed and Sealed this

Twenty-sixth Day of October, 1993

Attest:

BRUCE LEHMAN

*Attesting Officer*    *Commissioner of Patents and Trademarks*